US012645636B2

(12) United States Patent
Anastasio

(10) Patent No.: US 12,645,636 B2
(45) Date of Patent: Jun. 2, 2026

(54) TIME MULTIPLEXING TECHNIQUE TO TRANSFORM SINGLE CORE PROCESSOR IN A MULTICORE PROCESSOR

(71) Applicant: STMicroelectronics International N.V., Geneva (CH)

(72) Inventor: Antonio Anastasio, Naples (IT)

(73) Assignee: STMicroelectronics International N.V., Geneva (CH)

( * ) Notice: Subject to any disclaimer, the term of this patent is extended or adjusted under 35 U.S.C. 154(b) by 441 days.

(21) Appl. No.: 18/371,173

(22) Filed: Sep. 21, 2023

(65) Prior Publication Data

US 2025/0103552 A1 Mar. 27, 2025

(51) Int. Cl.
| | |
|---|---|
| *G06F 9/45* | (2006.01) |
| *G06F 1/10* | (2006.01) |
| *G06F 13/40* | (2006.01) |
| *G06F 15/82* | (2006.01) |

(52) U.S. Cl.
CPC ................ *G06F 15/82* (2013.01); *G06F 1/10* (2013.01); *G06F 13/4031* (2013.01)

(58) Field of Classification Search
CPC .... G06F 3/0662; G06F 9/455; G06F 9/45504; G06F 9/45533; G06F 9/45541; G06F 9/45554; G06F 9/4881; G06F 9/5061; G06F 9/5077
See application file for complete search history.

(56) References Cited

U.S. PATENT DOCUMENTS

| | | | |
|---|---|---|---|
| 11,740,921 B2 * | 8/2023 | Olmsted-Thompson | ................... G06F 9/4881 718/1 |
| 2022/0244978 A1 | 8/2022 | Dale et al. | |
| 2022/0414052 A1 | 12/2022 | Li et al. | |
| 2023/0070764 A1 | 3/2023 | Deshpande et al. | |
| 2024/0111560 A1 * | 4/2024 | Panda | ................... G06F 9/3555 |

FOREIGN PATENT DOCUMENTS

CN 109542831 B 5/2023

OTHER PUBLICATIONS

Wilson, Michelle: "What Is Hyper-Threading?," Hewlett Packard, Nov. 12, 2019, 11 pgs.
Intel Corporation: "Hyper-Threading Technology Architecture and Microarchitecture," Trusted Connectivity Alliance, Dec. 2009, 192 pgs.

* cited by examiner

*Primary Examiner* — Andy Ho
(74) *Attorney, Agent, or Firm* — Crowe & Dunlevy LLC

(57) ABSTRACT
Disclosed herein a method for transforming a single processor system into an effective multicore system with few modifications to the existing processor. The transformation is achieved by wrapping the processor with a CPU Manager module, which intercepts all CPU transactions, remaps addresses, manages interrupt lines, and controls the CPU clock using clock gating. The transformation to n effective multicore system brings about reduced area and power impacts compared to a full duplication of the whole system, while still reusing the existing program in a multicore environment.

22 Claims, 4 Drawing Sheets

TIME MULTIPLEXING TECHNIQUE TO TRANSFORM SINGLE CORE PROCESSOR IN A MULTICORE PROCESSOR

TECHNICAL FIELD

This application is directed to the field of microprocessors and, in particular, to the conversion of a single-core processor into a functionally equivalent multi-core system without the physical addition of more cores.

BACKGROUND

The evolution of computing demands has increasingly necessitated the performance of several tasks simultaneously, with applications requiring the processing power to handle multiple tasks or threads in parallel. The ability of the processor to handle these simultaneous tasks efficiently has been a particular area of concern. Single core processors, due to their inherent architecture, are limited in their ability to manage numerous parallel tasks. As a consequence, this architectural constraint complicates the process of software programming, particularly when the number of parallel tasks (N) is substantial, such as N=8 or even more.

Conventionally, to overcome this limitation, a common strategy involved the development of a single-processor system paired with a complex software scheduler. This software scheduler would arbitrate access to the processor among multiple tasks. Alternatively, genuine multicore systems, featuring multiple processors, each with its own bus and memory, were developed. While these approaches allowed for parallel task execution, they also introduced significant complications.

The implementation of a multicore system, although efficient in handling parallel tasks, requires the duplication of processors, buses, and memory. This duplication is not only expensive in terms of manufacturing and power consumption but also results in a larger physical footprint. The size and complexity of a multicore system can be prohibitive in scenarios where space is limited or cost-sensitive, such as embedded systems or portable devices.

On the other hand, implementing a complex single-processor system paired with a software scheduler involves managing complex task scheduling algorithms and real-time constraints. The development, testing, and maintenance of such systems become time-consuming and expensive. Additionally, this approach requires software developers to possess specialized knowledge of concurrent programming, real-time systems, and low-level hardware interfaces. It also tends to be less efficient than genuine multicore systems due to the overhead involved in switching between tasks.

Consequently, there is a persistent need in the industry for a solution that can handle parallel tasks efficiently without the drawbacks associated with genuine multicore systems or single-processor systems with complex software schedulers. As such, further development is needed.

SUMMARY

The disclosed embodiments relate to a computing system and method for dynamically transforming a single-core central processing unit (CPU) into multiple virtual CPUs. In one embodiment, the computing system may include a physical memory and a physical CPU that is connected to the physical memory via a network-on-chip (NOC). This NOC may facilitate communication between the physical CPU and the physical memory.

The physical CPU may be subdivided into several virtual CPUs. Additionally, a number of virtual CPU managers may be allocated, where each of these virtual CPU managers may be associated with a corresponding virtual CPU. A bus arbiter that resides within the physical CPU may manage communications between these virtual CPUs and the NOC. This management may involve routing communications from the NOC to the appropriate virtual CPUs.

Each virtual CPU manager may have the capability to intercept transactions taking place on a data bus and an instruction bus of the physical CPU. These intercepted transactions may be dynamically modified and routed to the virtual CPU that is associated with the intercepting virtual CPU manager. Further, in situations where a virtual CPU manager awaits external data, it may gate or control the clock cycles designated for its associated virtual CPU.

In some embodiments, the gating process managed by each virtual CPU manager may influence the operational frequency of its corresponding virtual CPU. This gating can be in response to various external data scenarios, such as when waiting for an answer to a transaction read or a write acknowledgment. In specific instances, gating might involve pausing the clocking of the virtual CPU if there isn't an immediate response to a read operation. Once the read data is available, the gating might be released. Furthermore, the gating mechanism may allow for a dynamic allocation of clock cycles among the virtual CPUs, reallocating paused clock cycles from one virtual CPU to another that isn't waiting for external data.

The management of communications between the virtual CPUs and the NOC may adopt various schemes, such as a round-robin scheme executed on both the instruction bus and the data bus of the physical CPU. Each virtual CPU manager may also maintain a dynamic mapping relationship between virtual memory addresses used by its corresponding virtual CPU and the physical memory addresses within the physical memory. This dynamic mapping might provide that each virtual CPU accesses a unique memory window within the physical memory.

Additionally, certain virtual CPUs may have dedicated peripheral spaces for accessing peripherals. Some virtual CPUs might share peripherals in a shared peripheral space, where one specific virtual CPU manager might exclusively manage these shared peripherals, which could include components like timers or UARTs.

In another embodiment, the disclosed embodiments present a method of dynamically transforming a single-core central processing unit (CPU) into multiple virtual CPUs. The method may include subdividing a physical CPU connected to a physical memory via a network-on-chip (NOC) into a plurality of virtual CPUs, allocating a plurality of virtual CPU managers such each virtual CPU manager is associated with a corresponding one of the virtual CPUs, and utilizing a bus arbiter within the physical CPU to manage communications between the plurality of virtual CPUs and the NOC, by routing communications from the NOC to corresponding ones of the virtual CPUs. The method may further include intercepting, by each virtual CPU manager, transactions on a data bus and an instruction bus of the physical CPU, and dynamically modifying and routing the intercepted transactions to the virtual CPU associated with that virtual CPU manager, and gating, by each virtual CPU manager, clock cycles allocated to its associated virtual CPU during periods when it awaits external data.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein. In the below, note that any functionality or component block described as being "virtual" is produced by software executed on physical hardware.

Figures 1A, 1B:
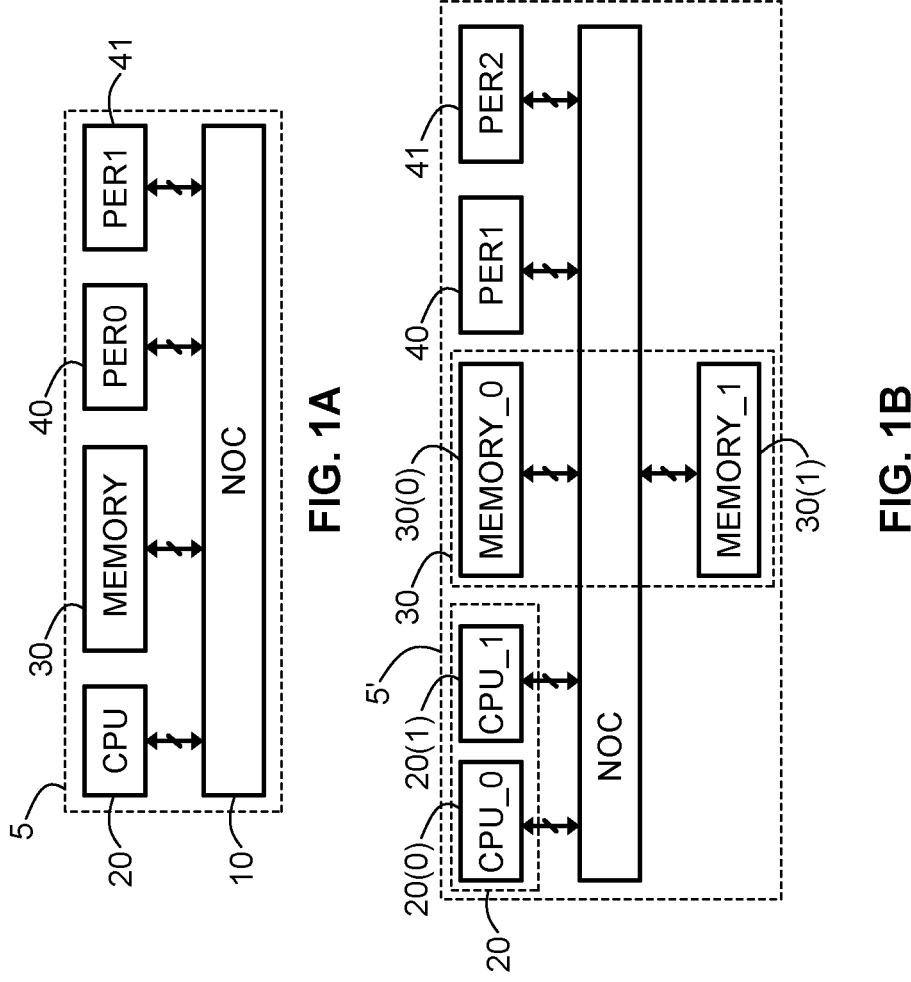
FIG. 1A is a block diagram of a physical single-core system disclosed herein.
FIG. 1B is a block diagram of a virtual multi-core system formed from the single-core system of FIG. 1A.

Refer now to FIG. 1A, showing a single-core system 5, including a single-core central processing unit (CPU) 20 operating at a frequency of Fcpu, memory 30, and peripherals 40 and 41 in communication with one another over a network-on-chip (NOC) 10. The goal of the architecture described herein is to provide a way for this single-core system 5 to operate as a virtual multi-core system 5', shown in FIG. 1B. In the virtual multi-core system 5', the single-core CPU 20 is virtually divided into a first virtual CPU_0 20(0) and a second virtual CPU_1 20(1), each operating a frequency of Fcpu/2 (e.g., operating at Fcpu divided by the total number of virtual CPUs that the physical CPU 20 is divided into), the memory 30 is divided into a first virtual memory (MEMORY_0) 30(0) and a second virtual memory MEMORY_1) 30(1). In this way, the virtual multi-core system 5' can act as multiple of the single-core systems 5.

Figures 2A, 2B:
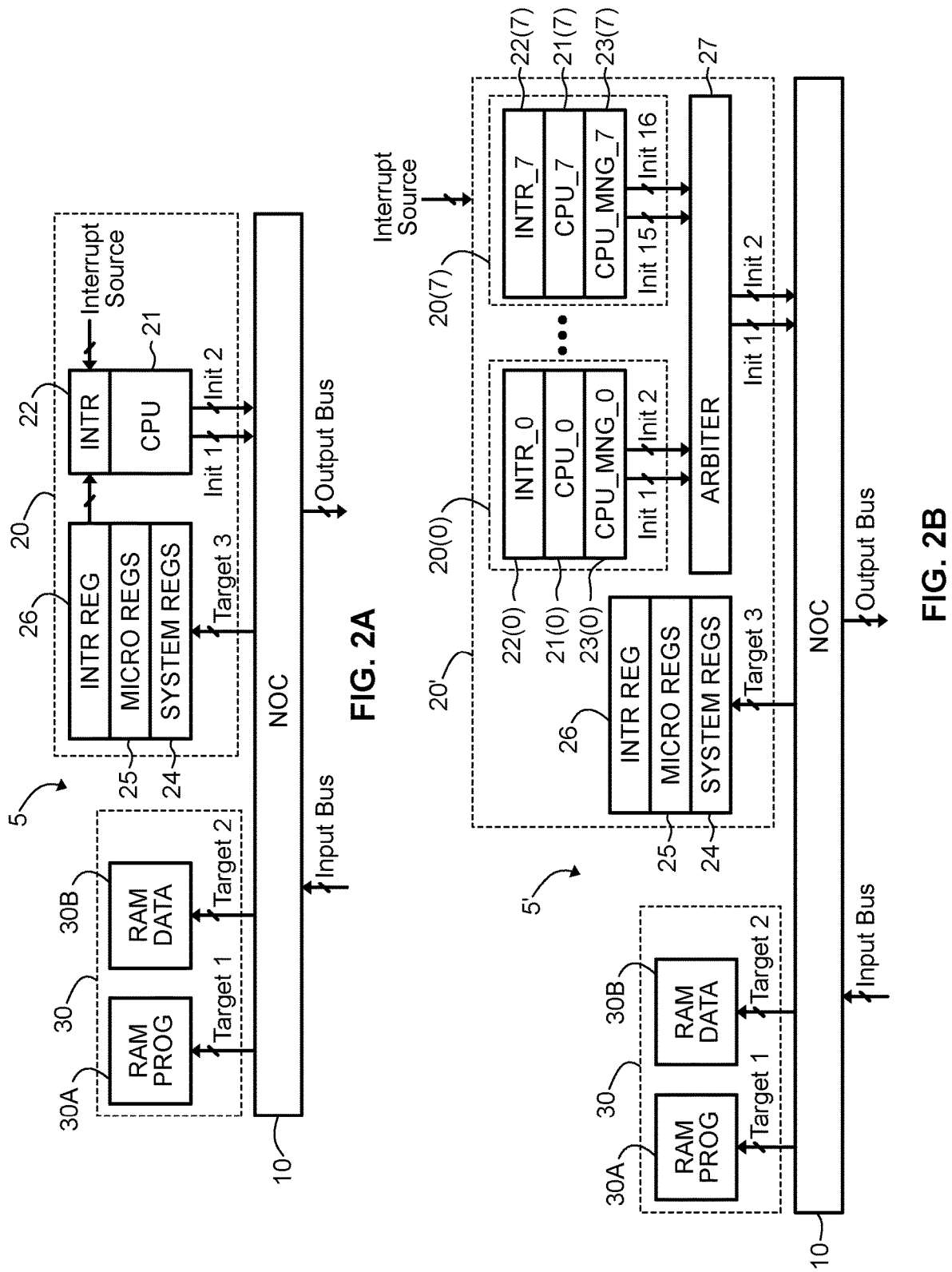
FIG. 2A is a more detailed block diagram of a physical single-core system disclosed herein.
FIG. 2B is a more detailed block diagram of a virtual multi-core system formed from the single-core system of FIG. 2A.

Greater details are now provided with reference to FIGS. 2A-2B. First, specifics of the physical single-core system 5 are described. The single-core system 5 is arranged in network on a chip (NOC) setup, a method of data transmission that serves as the backbone of communication within this system, allowing different components to effectively exchange and manage data traffic throughout the structure. Within this system 5, there are two separate sections of the RAM 30: the RAM PROG 30A section and the RAM DATA 30B section. The section of the RAM 30 labeled as RAM PROG 30A is where programs or sets of executable instructions are stored. These instructions are fetched by the CPU 20 for execution. The section of the RAM 30 labeled as RAM DATA 30B is where the data being processed or manipulated by the aforementioned programs is stored. The CPU 20 can perform operations with this data, reading from or writing to the RAM 30 as necessary.

The CPU 20 includes several types of registers, namely system registers SYSTEM REGS 24, microprocessor registers MICRO REGS 25, and interrupt registers INTR REG 26. The system registers SYSTEM REGS 24 and microprocessor registers MICRO REGS 25 are small storage spaces within the CPU 20, which hold data, instructions, or addresses utilized in the operation of the processor. The interrupt registers INTR REG 26 are components related to interrupt handling and may store interrupt requests, interrupt status information, or addresses of interrupt handlers.

The CPU core 21, being the main execution unit, is responsible for fetching, decoding, and executing instructions, interacting with the RAM 30 and registers 23, 24, 25 to perform computations and execute programs.

Lastly, the interrupt handler INTR 22 handles immediate, high-priority tasks. The source of these interrupts, labeled as Interrupt Source, can vary, ranging from internal hardware devices to system timers.

These components in the system are interconnected and communicate with each other via the NOC 10, allowing for efficient task handling and data management. The NOC 10 may receive input for one or more of the above-described components via an input bus and may communicate output from one or more of the above-described components to an external component via an output bus.

The aim of the disclosed architecture, as previously described, is to transform a single-core system 5 into a virtual multi-core system 5', depicted in FIG. 2B. This transformation involves the subdivision of the physical CPU 20 into eight virtual CPUs 20(0), . . . , 20(7), each incorporating a virtual CPU core 21(0), . . . , 21(7), a virtual interrupt handler INTR 22(0), . . . , 22(7), and a virtual CPU manager 23(0), . . . , 23(7).

The CPU manager 23(0), . . . , 23(7) within each virtual CPU 20(0), . . . , 20(7) has several functions in providing for smooth efficient operation of the system. It handles CPU transactions, which are interactions between different parts of the virtual CPU in question, such as the transferring instructions and data. To elaborate, a CPU typically has two separate pathways for data and instructions, known as the data bus and the instruction bus, respectively. The instruction bus carries instructions to be executed by the CPU, while the data bus transfers actual data that the instructions work on. These are distinct from the NOC 10 and its input/output bus connecting the NOC 10 to the rest of the system. The CPU manager 23(0), . . . , 23(7) intercepts and routes transactions occurring on these buses, dynamically modifying addresses as necessary. Tasks under this purview include remapping data space addresses and peripheral spaces, along with implementing write protection and common read/write allocation for instruction space.

A strategy utilized by the CPU manager 23(0), . . . , 23(7) is that of CPU clock gating. This mechanism enables the virtual CPUs 20(0), . . . , 20(7) to operate without alterations. In this approach, the clock for a given virtual CPU is 'gated', or effectively paused, when it is awaiting external information, such as an 'answer to a transaction read' or 'write acknowledge.'

Typically, a CPU expects a response (the 'read data') in the ensuing clock cycle when it reads from the instruction memory or data memory. However, in a multicore configuration, this response might experience a delay due to the shared memory amongst all CPUs. To maintain regular operation of the virtual CPUs 20(0), . . . , 20(7) in these multicore scenarios, the clocks of virtual CPUs waiting for a response are gated-essentially paused-until the read data becomes available. From the perspective of these virtual CPUs, this appears as a standard operation, as the read data surfaces in the next 'active' clock cycle received by those virtual CPUs when the clock is ungated. The same process applies when the clock of a virtual CPU is gated while the bus is unavailable for a write operation, leading the virtual CPU to wait until bus availability is restored.

While the virtual CPUs do enter an idle state during instances of clock gating, between instances of clock gating—when the virtual CPUs are not awaiting external data—the clocks of those virtual CPUs run as usual, and the virtual CPUs stay active, thereby continuing to execute instructions. This approach optimizes the effective computational power of the virtual CPUs 20(0), . . . , 20(7).

In a typical system without clock gating, each virtual CPU 20(0), . . . , 20(7) would be allocated one active clock cycle for every N clock cycles of the physical CPU 20, resulting in each virtual CPU 20(0), . . . , 20(7) having a computational power of 1/N of the original power. However, during periods when a virtual CPU 20(0), . . . , 20(7) is waiting for external data, it would not use its clock cycle effectively, leading to reduced computational power.

On the other hand, the clock gating strategy allows more effective utilization of clock cycles, resulting in higher computational power for each virtual CPU 20(0), . . . , 20(7). When a virtual CPU 20(0), . . . , 20(7) is waiting for external data, its clock is gated, and the unused clock cycle is not wasted. Instead, it could be allocated to another virtual CPU 20(0), . . . , 20(7) that is not waiting for external data, allowing the second virtual CPU 20(0), . . . , 20(7) to perform additional computations. This means each clock cycle of the physical CPU 20 can be used more efficiently.

As a result, computational power of the virtual CPUs 20(0), . . . , 20(7) is effectively increased. Even with N=8 virtual CPUs, the effective performance of each CPU can approach ⅕ of the original power in some cases, thanks to the efficient use of clock cycles. This is greater than the expected ⅛ computational power if the clock cycles were distributed evenly without clock gating.

Moreover, the clock gating technique offers an additional benefit: it allows for efficient context switching between different tasks or CPUs. Because the gating and un-gating of the clock occur without delay, this technique enables a 'zero-time' context switch.

The CPU managers 23(0), . . . , 23(7) play a role in the operation of the virtual CPUs 20(0), . . . , 20(7) in the multi-core system 5'. Each CPU manager 23(0), . . . , 23(7) exposes a specific register containing a unique index from 0 to N−1, which corresponds to its managed virtual CPU 20(0), . . . , 20(7). This index enables each virtual CPU 20(0), . . . , 20(7) to differentiate its program and execute tasks specific to its context.

In the virtual multi-core system 5', an aspect of the system architecture is the distribution of tasks and peripheral control among the virtual CPU cores 21(0), . . . , 21(7). For instance, only virtual CPU core 21(0) is programmed to handle timers and control the UART. These peripherals, among others, reside in the common peripherals area 40-1, shared among all virtual CPUs 21(0), . . . , 21(7). While each virtual CPU core 21(0), . . . , 21(7) has assigned dedicated peripherals 40-47, certain shared peripherals within the common space 40-1, such as timers and UART, are exclusively managed by virtual CPU 20(0). This division of control provides for coordinated and conflict-free access to these shared resources.

Figures 5A, 5B:
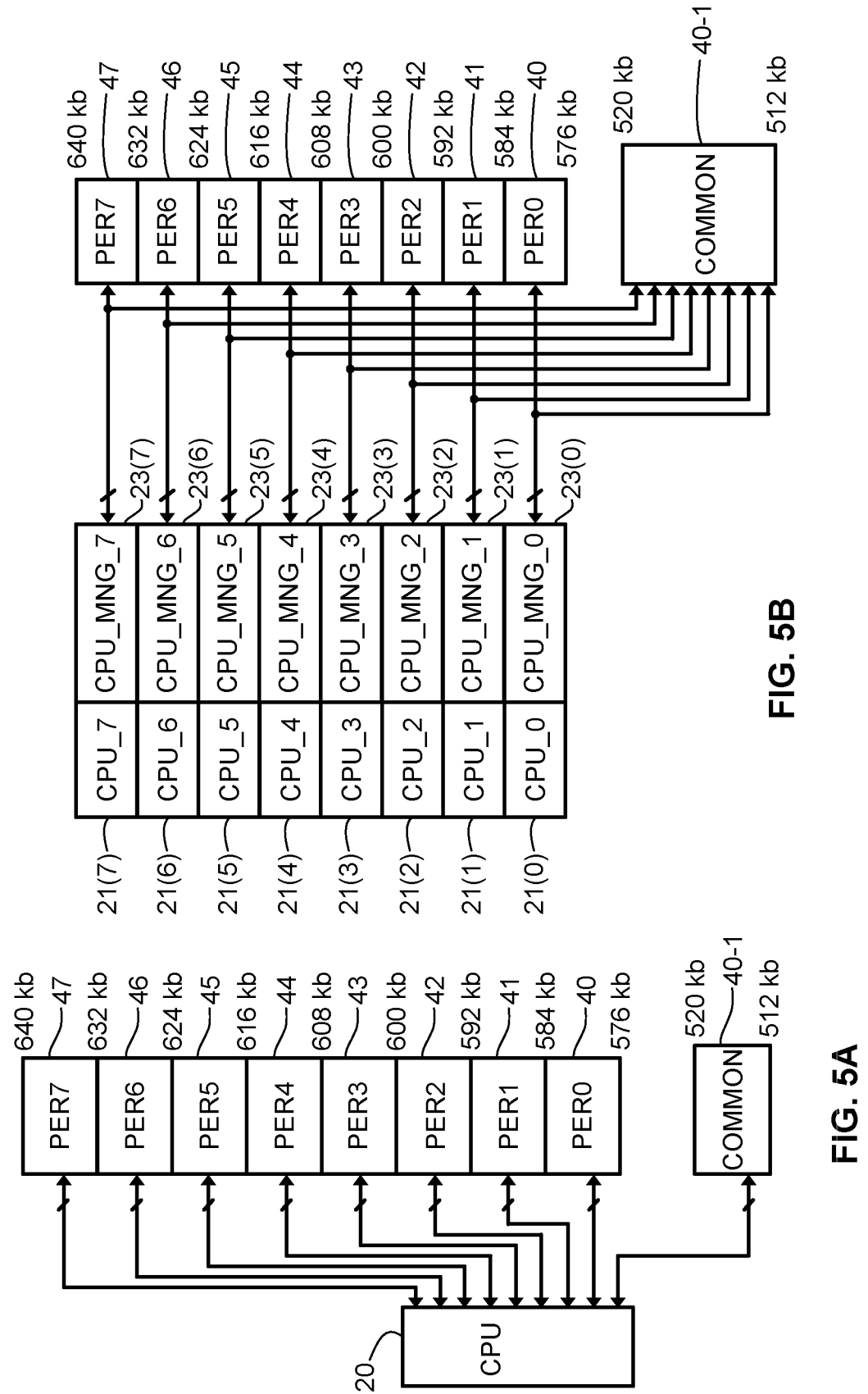
FIG. 5A is a diagram showing the division of the peripheral space of the physical single-core system of FIG. 2A into a common peripheral space and an individual peripheral space.
FIG. 5B is a diagram showing the division of the peripheral space of the virtual multi-core system of FIG. 2B into a common peripheral space and individual peripheral spaces dedicated to different ones of the virtual cores.

In the single-core system 5 depicted in FIG. 5A, each peripheral 40-47 is dedicated to the single physical CPU core 20, and there exists a common peripheral space 40-1. Transitioning to the virtual multi-core system 5', shown in FIG. 5B, the peripherals are allocated differently. Each peripheral is assigned to a different one of the virtual CPU cores 21(0), . . . , 21(7), while the common peripheral space 40-1 remains accessible to all. This partitioning between the virtual CPUs and the dedicated peripherals is seamlessly managed by the CPU managers 23(0), . . . , 23(7), which intercept transactions to the peripheral space and route them to the corresponding peripheral spaces assigned to each virtual CPU 20(0), . . . , 20(7). This strategy provides for efficient use of system resources and harmonious operation within the system.

The CPU manager 23(0), . . . , 23(7) also oversees the management of sideband signals. In some cases, it becomes necessary to manage specific signals connected to the virtual CPUs 20(0), . . . , 20(7). To cater to this need, a second-level interrupt mask has been inserted to enable certain interrupts only for some virtual CPUs 20(0), . . . , 20(7). For this reason, a new virtual register has been exposed by the CPU manager 23(0), . . . , 23(7) to enable locally some specific interrupt line. For instance, external interrupt X is enabled only on virtual CPUy. The mask register exposes all interrupt lines, and the selection is performed by the specific virtual CPU in software.

Memory management in is conducted by the CPU managers 23(0), . . . , 23(7). They maintain consistent access to the instruction memory 30A, while dynamically adjusting the addresses for access to the data memory space 30B. This approach enables each virtual CPU 20(0), . . . , 20(7) to access its own distinct memory window within the shared memory space 30. As a result, each virtual CPU 20(0), . . . , 20(7) can access only its designated portion of the data memory space 30B, even though all these portions exist within the same shared memory space 30. The CPU managers 23(0), . . . , 23(7) guide these accesses to the correct physical addresses. This means that the data memory 30B is effectively divided into N sections, one for each virtual CPU from 20(0), . . . , 20(7), thereby establishing virtual boundaries within the same physical memory 30.

Further details about the memory space utilized by the virtual multi-core system 5' will now be given with reference to FIG. 3B. Before that, consider the example shown in FIG. 3A, which depicts the physical RAM program space 30A and the physical RAM data space 30B in the system 5. In this example, the total RAM 30 is 96 kb, with the RAM program space 30A being 32 kb and physically assigned as the 32 kb least significant bits (LSBs) of the RAM 30. The RAM data space 30B, on the other hand, is 64 kb wide and is physically assigned as the 64 kb most significant bits (MSBs) of the RAM 30.

In contrast, in the virtual multi-core system 5', the RAM data space 30B is partitioned into a number of sections N equal to the number of virtual CPUs, which in this case is eight. These sections are shown in FIG. 3B as RAM data space 30B (0), . . . , 30B (7), each being assigned to a respective one of the virtual CPU cores from 21(0), . . . , 21(7). The RAM program space 30A remains accessible to each virtual CPU core 21(0), . . . , 21(7) but is maintained as write-protected to prevent data corruption.

Figures 3A, 3B, 4:
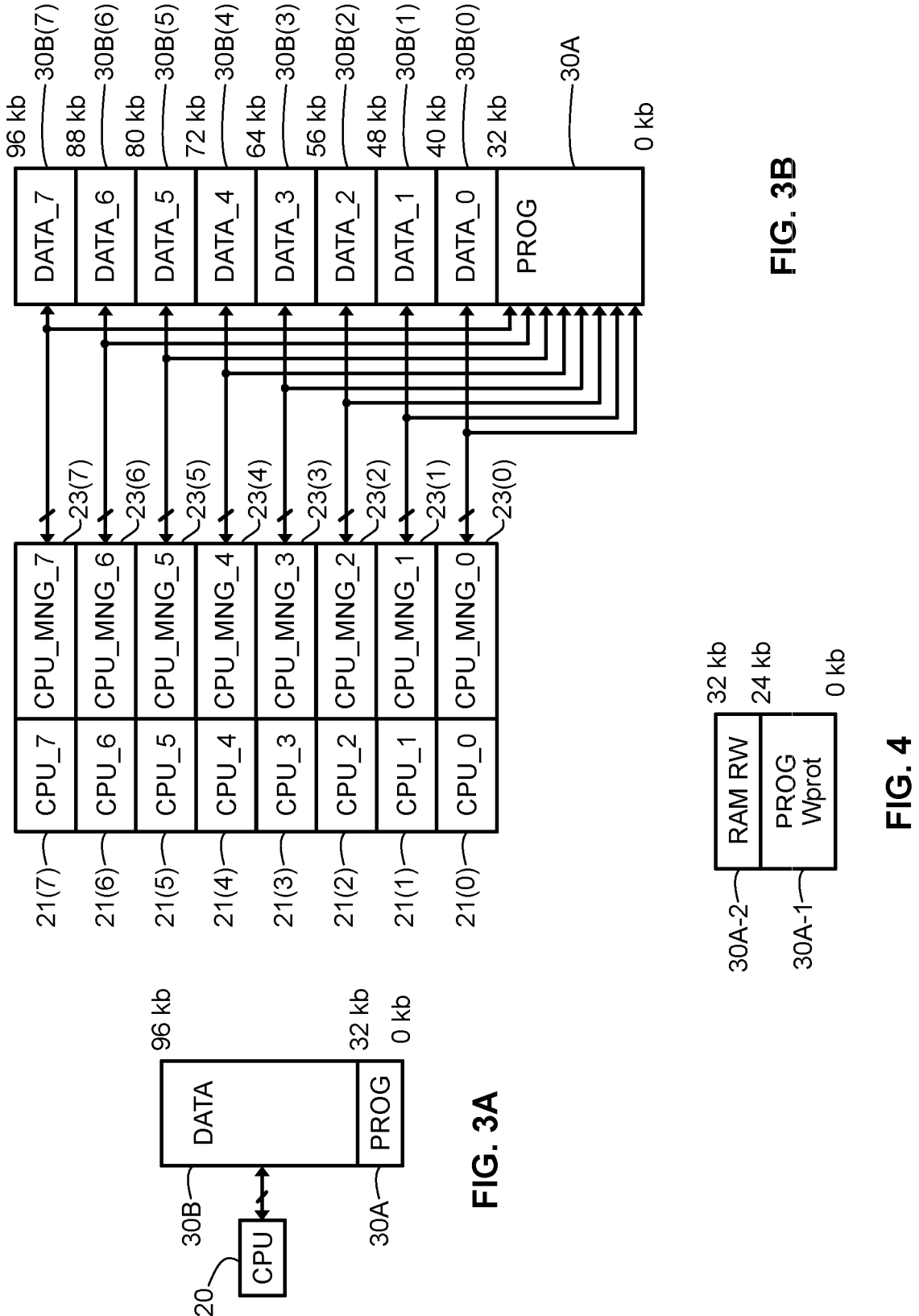
FIG. 3A is a diagram showing the division of the memory space of the physical single-core system of FIG. 2A into a data space and a program space.
FIG. 3B is a diagram showing the division of the memory space of the virtual multi-core system of FIG. 3A into a common program space and individual data spaces.
FIG. 4 is a diagram showing the division of the program space of the virtual multi-core system of FIG. 2B.

An upper 30A-2 section of the RAM program space 30A is used as a common read-write (RW) mailbox area among the virtual CPUs 20(0), . . . , 20(7), while the lower section 30A-1 is kept write-protected to prevent program corruption, as shown in the example FIG. 4. This scheme serves two main purposes. First, it helps ensure that a virtual CPU 20(0), . . . , 20(7) cannot corrupt the program in the event of a failure. Second, it allows for message interchange between the virtual CPUs 20(0), . . . , 20(7) as needed. Thus, it not only maintains the integrity of the software but also facilitates communication between the various virtual CPUs 20(0), . . . , 20(7).

The bus arbiter 27 plays a role in managing transactions between the virtual CPUs 20(0), . . . , 20(7) and the network-on-chip (NOC) 10. The core responsibilities of the bus arbiter 27 include routing the N instruction bus transactions, which originate from the "instruction bus" of the CPU manager 23(0), . . . , 23(7) to the corresponding single target port on the NOC 10, referred to as Target 1. It is also tasked with routing the N data bus transactions from the "data bus" of the CPU manager 23(0), . . . , 23(7) to the appropriate target ports on the NOC 10. These ports may include Target 1, Target 2, and the Output Bus. To balance bus availability as much as possible among the virtual CPUs 20(0), . . . , 20(7), the bus arbiter 27 executes a round-robin scheme on both the N instruction bus and the N data bus. Lastly, the bus arbiter 27 is equipped to manage up to three transactions in parallel against the three main target ports of the NOC-Target 1, Target 2, and the Output Bus. By performing these tasks, the bus arbiter 27 provides for fair and efficient access to system resources among the different virtual CPUs 20(0), . . . , 20(7), aiming to maximize system throughput by enabling simultaneous transactions to different target ports when possible.

To support the operation of the multiple virtual CPUs 20(0), . . . , 20(7), the NOC 10 is configured to manage 2N initiators. An initiator in this context is a device or component in the system that initiates a transaction or communication over the NOC 10. An initiator may be one of the virtual CPUs 20(0), . . . , 20(7), however peripherals 40, 50 can also serve as initiators, starting a transaction by sending data or instructions to the virtual CPUs 20(0), . . . , 20(7) or other peripherals over the NOC 10. The NOC 10 can handle transactions initiated by all virtual CPUs 20(0), . . . , 20(7), thus managing 2N initiators. Further, the ability of the NOC 10 to manage out-of-order transactions enhances throughput and reduces system idle times.

Through this architecture, the virtual multi-core system 5' successfully mimics the functionality of a true multi-core system, enabling effective utilization of the existing core while sharing the same memory, thereby creating a more efficient computing environment.

This system transformation carries interesting implications for software development. The single-core processor system 5 has evolved into a multi-core processor system 5'. Notably, this transformation does not require any modification to the software to be executed thereon. Even the memory 30 and the NOS 10 are shared across N virtual CPUs 20(0), . . . , 20(7), virtual separation of these virtual CPUs is maintained. Each virtual CPU 20(0), . . . , 20(7) operates under the effect of its virtual clock, and the software can be developed and executed as if it were running on N completely isolated systems.

The multi-core processor system 5' also offers the flexibility for interaction (through mechanisms such as mailboxes) between the virtual CPUs 20(0), . . . , 20(7), which can enable dedicated tasks as desired. This is in addition to the independent operation of each virtual CPU 20(0), . . . , 20(7), providing for versatile, adaptable software development.

The hardware implementation of N virtual CPUs 20(0), . . . , 20(7) presents a significant advantage over a software scheduler. Specifically, it allows for context switching in effectively zero clock cycles. That means the system 5' does not need to allocate time for saving and reloading the context during task switching, leading to efficient use of computational resources and potentially significant performance improvements. This aspect is particularly helpful in a multi-core environment where rapid context switching is key to maximizing the utilization of the processing power of the physical CPU 20.

Overall, these features simplify the software development process for multi-core systems. They allow developers to design their programs as if they are intended for single-core systems, thereby reducing the complexity typically associated with multi-core programming. This approach also optimizes system performance by providing for efficient use of clock cycles and facilitating faster context switching.

Finally, it is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A computing system, comprising:

a physical memory;

a physical central processing unit (CPU) including a bus arbiter; and a network-on-chip (NOC) facilitating communication between the physical CPU and the physical memory;

wherein the physical CPU is configured to be subdivided into a plurality of virtual CPUs and a plurality of virtual CPU managers, with each virtual CPU manager being associated with a corresponding one of the virtual CPUs;

wherein the bus arbiter is configured to manage communications between the plurality of virtual CPUs and the NOC by routing communications from the NOC to corresponding ones of the virtual CPUs;

wherein each virtual CPU manager is configured to intercept, dynamically modify, and route transitions on a data bus and an instruction bus of the physical CPU to the virtual CPU associated with that virtual CPU manager; and wherein each virtual CPU manager is configured to gate clock cycles allocated to its associated virtual CPU during periods when it awaits external data.

2. The computing system of claim 1, wherein the clock gating performed by each virtual CPU manager controls an operational frequency of its associated virtual CPU.

3. The computing system of claim 1, wherein the external data comprises at least one of an answer to a transaction read or a write acknowledgment.

4. The computing system of claim 1, wherein the clock gating performed by each virtual CPU manager pauses clocking of its associated virtual CPU in an absence of an immediate response to a read operation and releases the gating once read data becomes available.

5. The computing system of claim 1, wherein the clock gating performed by each virtual CPU manager provides for dynamic allocation of clock cycles among the plurality of virtual CPUs, such that a paused clock cycle from a virtual CPU having its clock gated is reallocated to a virtual CPU not awaiting external data.

6. The computing system of claim 1, wherein the bus arbiter manages the communications between the plurality of virtual CPUs and the NOC by executing a round-robin scheme on both the instruction bus and the data bus of the physical CPU.

7. The computing system of claim 1, wherein each virtual CPU manager maintains a dynamic mapping between virtual memory addresses used by its associated virtual CPU and physical memory addresses within the physical memory.

8. The computing system of claim 7, wherein the dynamic mapping provides that each virtual CPU accesses a distinct memory window within the physical memory.

9. The computing system of claim 1, wherein each virtual CPU manager adjusts addresses for transitions on the data bus to enable its associated virtual CPU to access its designated portion of the physical memory.

10. The computing system of claim 1, wherein each virtual CPU is associated with a dedicated peripheral space for peripheral access.

11. The computing system of claim 1, wherein at least some of the plurality of virtual CPUs are associated with given shared peripherals in a shared peripheral space, with one of the virtual CPU managers exclusively manages the given shared peripherals.

12. The computing system of claim 11, wherein the given shared peripherals include timers.

13. The computing system of claim 11, wherein the given shared peripherals include UARTs.

14. A method of dynamically transforming a single-core central processing unit (CPU) into multiple virtual CPUs, the method comprising:

subdividing a physical CPU connected to a physical memory via a network-on-chip (NOC) into a plurality of virtual CPUs;

allocating a plurality of virtual CPU managers such each virtual CPU manager is associated with a corresponding one of the virtual CPUs;

utilizing a bus arbiter within the physical CPU to manage communications between the plurality of virtual CPUs and the NOC, by routing communications from the NOC to corresponding ones of the virtual CPUs;

intercepting, by each virtual CPU manager, transactions on a data bus and an instruction bus of the physical CPU, and dynamically modifying and routing the intercepted transactions to the virtual CPU associated with that virtual CPU manager; and gating, by each virtual CPU manager, clock cycles allocated to its associated virtual CPU during periods when it awaits external data.

15. The method of claim 14, wherein the gating performed by each virtual CPU manager controls an operational frequency of its associated virtual CPU.

16. The method of claim 14, wherein the external data comprises at least one of an answer to a transaction read or a write acknowledgment.

17. The method of claim 14, wherein gating comprises: detecting, by a given virtual CPU manager, an absence of data transactions for its associated virtual CPU; and temporarily halting clock cycles to the associated virtual CPU in response to the detected absence.

18. The method of claim 17, further comprising: monitoring, by the given virtual CPU manager, for a resumption of external data transactions for the associated virtual CPU; and releasing the gating of the clock cycles for the associated virtual CPU upon detection of the resumption.

19. The method of claim 14, wherein the gating performed by each virtual CPU manager pauses clocking of its associated virtual CPU in an absence of an immediate response to a read operation and releases the gating once read data becomes available.

20. The method of claim 14, wherein the gating performed by each virtual CPU manager provides for dynamic allocation of clock cycles among the plurality of virtual CPUs, such that a paused clock cycle from a virtual CPU having its clock gated is reallocated to a virtual CPU not awaiting external data.

21. The method of claim 14, wherein the bus arbiter is used to manages the communications between the plurality of virtual CPUs and the NOC by executing a round-robin scheme on both the instruction bus and the data bus of the physical CPU.

22. The method of claim 14, further comprising using each virtual CPU manager to maintain a dynamic mapping between virtual memory addresses used by its associated virtual CPU and physical memory addresses within the physical memory.

* * * * *